Patented Sept. 14, 1948

2,449,528

UNITED STATES PATENT OFFICE 2,449,528

COPOLYMERS OF MONOVINYLPHENOX-THINES AND METHOD OF PREPARING THE SAME

Ralph G. Flowers and Leola W. Flowers, Pittsfield, Mass., assignors to General Electric Company, a corporation of New York No Drawing. Application May 29, 1947, Serial No. 751,470

14 Claims. (Cl. 260—86.5)

This invention relates broadly to copolymers of vinyl compounds and to methods of preparing the same. More particularly, the invention is concerned with new and useful compositions of matter comprising the products of polymerization of a mixture of different copolymerizable ingredients including a monovinylphenoxthine, e. g., 3-vinylphenoxthine, and a compound containing a $CH_2=C<$ grouping, more particularly a diene, e. g., butadiene, isoprene, piperylene, etc.; a vinyl-substituted aromatic hydrocarbon, e. g., styrene, methylstyrenes, divinylbenzene, vinylfluorenes, acenaphthylene, etc.; an acrylic compound, e. g., acrylonitrile, acrylamide, methacrylonitrile, methacrylamide, an ester of acrylic or methacrylic acid (e. g., methyl acrylate, methyl methacrylate, etc.); an ethylenically-unsaturated aliphatic hydrocarbon, e. g., ethylene, chloroethylenes, fluoroethylenes, chlorofluoroethylenes, etc. and the like.

In our copending application, Serial No. 751,468 filed concurrently herewith and assigned to the same assignee as the present invention, monovinylphenoxthines and the method of preparing these compounds are disclosed and claimed. We have discovered that these monomeric materials may be copolymerized with other polymerizable materials as set forth above, and the present invention is directed to the preparation of such copolymers.

As described in the above-mentioned application, monovinylphenoxthines are prepared by first acetylating phenoxthine with an acetylating agent, e. g., acetic acid or anhydride, acetyl chloride or bromide, ketene, etc., to obtain a monoacetylphenoxthine, e. g., 3-acetylphenoxthine. Diacetylphenoxthines may be prepared by further acetylation of monoacetylphenoxthines and polymerizable divinylphenoxthines may be obtained from the diacetylphenoxthines by employing the same method as that used for preparing the monovinylphenoxthines from monoacetylphenoxthines. Depending upon the position of the vinyl group desired in the monovinylphenoxthine, an acetylated phenoxthine having the acetyl group in the position corresponding to that vinyl group of the desired vinyl compound is hydrogenated to form an α-hydroxyethylphenoxthine. The α-hydroxyethylphenoxthine is then dehydrated in contact with a dehydration catalyst to obtain the monovinylphenoxthine. The monovinylphenoxthines are solid crystalline materials of relatively low melting point. 3-vinylphenoxthine, for example, has a melting point of 39.5–41° C.

Various methods of polymerizing mixtures of monomeric monovinylphenoxthines and other copolymerizable compounds may be employed, the most desirable method for any mixture depending largely on the properties of the other compound or compounds and the properties desired in the ultimate copolymer. For example, the mixture may be polymerized, as such, or it may be dissolved in a solvent with which all the members of the mixture are compatible. A small amount of solvent has little retarding effect upon, and in some cases actually accelerates, the polymerization of the mixtures. A moderately large amount of solvent tends to yield polymers of short chain lengths and often results in a period of induction so that even when very active catalysts, such as borontrifluoride, are used, a period of time elapses between the addition of the catalyst and the beginning of polymerization. This tendency is particularly marked when the polymerization is carried out at elevated temperatures. A very large amount of solvent often inhibits or retards the polymerization of the mixtures to such an extent that polymerization is not effected in a reasonable time. Another method which has been found effective, includes the preparation of an intimate mixture of the monomeric materials by preparing a suspension or emulsion of the monomers in a medium such as, for example, water.

The nature of the copolymers produced depends upon the condition of polymerization and the purity of the monomers employed. In general, the purer the monomers, the more readily and completely the polymerization occurs. In some cases where a monovinylphenoxthine normally copolymerizes with another monomer with difficulty and to only a slight degree, it will, in the presence of a third monomer, readily form a copolymer or a mixed polymer of the three compounds.

The polymerization of the mixtures of monomers may be accelerated or retarded as, for example, by varying the temperatures and types and quantities of catalysts employed. In general, it is desirable to choose conditions of polymerization such that the monomers polymerize at about the same rate. If the rate of polymerization of one monomer is considerably greater than that of the other monomer or monomers employed, it will go practically to completion before the other monomer or monomers have been polymerized or copolymerized. This may lead to the formation of mixed polymerization masses instead of copolymers.

The polymerization of a monovinylphenoxthine and mixtures thereof with other compounds that are copolymerizable with a monovinylphenoxthine is accelerated by effecting the polymerization in the presence of a vinyl polymerization catalyst. Examples of polymerization catalysts that may be employed are oxygen, ozone, ozonides, hydrogen peroxide, organic and inorganic acids and acidic substances, e. g., hydrochloric acid, hydrofluoric acid, sulfuric acid, boron fluoride, stannic chloride, antimony pentachloride, the halogens, etc., organic and inorganic peroxides, for instance, peroxides of the aromatic acid series, e. g., benzoyl peroxide, etc., peroxides of the aliphatic acid series, e. g., acetyl peroxide, stearyl peroxide, lauryl peroxide, etc., sodium peroxide, barium peroxide, etc., various per- compounds such as the persulfates, perchlorates, perborates, etc. Also effective in increasing the rate of polymerization are substances having a large surface area, e. g., carbon black, finely divided silica, certain metallic powders and finely divided clays, etc. Heat, light, (ultraviolet light) or heat and light may be used with or without a polymerization catalyst in accelerating the polymerization. Any suitable amount of catalyst may be used, but ordinarily the catalyst is employed in an amount ranging, for example, from a trace up to 3 or 4% or more by weight of the polymerization mixture, including the solvent or suspension or emulsion medium if such are employed.

The copolymerization products of the present invention may vary in accordance with the nature of the copolymerizable compound or compounds which are copolymerized with the monovinylphenoxthine. Although the proportions ordinarily will be within the range of, by weight, 10 to 90% monovinylphenoxthine to 90 to 10% of the other monomer or monomers, the amount of monovinylphenoxthine may be either higher or lower, for instance, from 1 to 99%, by weight, of monovinylphenoxthine to from 99 to 1%, by weight, of the other monomeric material or materials.

Monovinylphenoxthines can be cross-linked by compounds such as divinyl, diallyl and diethylene glycol ester compounds to form products that have increased heat resistance and can be readily machined and worked. Such products tend toward insolubility and infusibility as the percent of divinyl compound increases. The copolymers of monovinylphenoxthines with other vinyl compounds which contain only one $CH_2=C<$ group such as, for example, acrylic acid and acrylic acid esters are thermoplastic, and can be treated in general as any thermoplastic material. For example, they can be injection or compression molded, cast into films, oriented and fused.

The following examples will further illustrate how the invention may be carried out in practice, but the invention is not restricted by these examples. All parts are by weight.

Example 1

| | Parts |
|---|---|
| 3-vinylphenoxthine | 7.0 |
| Butadiene | 2.4 |
| Pertassium persulfate | .06 |
| Aqueous emulsion sol | 14.0 |

The emulsion sol employed in this example consisted of an aqueous solution containing 2.22% stearic acid, 0.95% potassium hydroxide and .24% di-octyl sodium sulfo-succinate. The above ingredients were placed in a glass tube which was then sealed and heated with agitation for about 15 hours at 55° C. The product, a rubber-like material, was dissolved in warm tolene and was then precipitated from solution with methyl alcohol. The precipitated copolymer was dissolved in ethylene dichloride. A tough, pliable film was cast from the ethylene dichloride solution. At 550 kilocycles this film was found to have a power factor of 0.395% and a dielectric constant of 2.55.

Example 2

| | Parts |
|---|---|
| 3-vinylphenoxthine | 5 |
| Vinyl acetate | 4 |
| Benzoyl peroxide | 1 |
| Benzene | 20 |

The above ingredients were mixed and heated at 100° C. in an oil bath for 20 hours. The resulting copolymer was soluble with difficulty in benzene and precipitated out as a white powder when the benzene solution was diluted with methyl alcohol. A yield of 70% was obtained in this reaction.

Example 3

| | Parts |
|---|---|
| 3-vinylphenoxthine | 5 |
| Acrylonitrile | 3 |
| Benzoyl peroxide | 1 |
| Benzene | 20 |

The above ingredients were heated in an oil bath at 100° C. for 20 hours. The resulting copolymer was a white powder which was only slightly soluble in benzene.

Example 4

| | Parts |
|---|---|
| 3-vinylphenoxthine | 5 |
| Styrene | 5 |
| Butyl hydroperoxide | 1 |
| Benzene | 20 |

The above ingredients were mixed and heated in an oil bath at 100° C. for 17 hours. A quantitative yield of white copolymer was obtained when the benzene solution was diluted with methyl alcohol.

Example 5

| | Parts |
|---|---|
| 3-vinylphenoxthine | 5 |
| Acenaphthylene | 5 |
| Benzoyl peroxide | 1 |
| Benzene | 20 |

A mixture of the above ingredients was heated for 16 hours in an oil bath at 100° C. A yield of approximately 70% of the copolymer was obtained by precipitation from benzene solution with methyl alcohol.

Example 6

| | Parts |
|---|---|
| 3-vinylphenoxthine | 5.0 |
| Maleic anhydride | 5.0 |
| Benzoyl peroxide | 0.5 |
| Acetone | 20.0 |

A solution of the above ingredients was heated for 15 hours in an oil bath at 80° C. The resulting copolymer was leached from the reaction mass with methyl alcohol. A 90% yield of white powdery copolymer was obtained.

The properties of films prepared from polymerized mixtures of monovinylphenoxthines and compounds of the diene type may be widely varied depending on the proportions of the monomers present in the initial mixture. More specifically we have found that as the ratio of diene to monovinylphenoxthine increases, the resulting films tend to be more tough and rubbery.

The copolymers of this invention may, in general, be modified to fill the requirements of specific applications for which the copolymers as such are not suitable. For example, plasticizers and fillers may be added to the mixtures of monomers prior to copolymerization, or they may be added after the polymerization of the mixtures has been completed. In general, plasticizers commonly used for polymers and copolymers known to the art may be employed in plasticizing the copolymers of this invention. The selection of the proper plasticizers depends largely upon properties of the particular copolymer involved. Useful molding powders may be prepared by mixing the copolymers with suitable fillers such as, for example, alpha cellulose, mica dust, oxides of titanium, talc, zinc oxide, magnesium oxide, asbestos, quartz, wood flour, cellulose or wool fibers, etc.

Various polymerizable compounds in addition to those heretofore specifically mentioned may be simultaneously polymerized or copolymerized with monovinylphenoxthines to obtain new and useful synthetic compositions. For instance, any compound containing a $CH_2=C<$ grouping (polymerizable $CH_2=C<$ grouping) in its molecular structure, that is, compounds containing a single $CH_2=C<$ grouping or a plurality (two, three, four or more) of $CH_2=C<$ groupings in the structure of the individual compound. Examples of such compounds are the esters, nitriles and amides of acrylic and α-substituted acrylic acids, vinyl esters and halides, methylene malonic esters, mono- and poly-allyl compounds, e. g., the di-, tri-, tetra- (and higher) allyl derivatives. For instance, the copolymerizable material may be a polyallyl ester of an inorganic polybasic acid, of a saturated or unsaturated aliphatic polycarboxylic acid or of an aromatic polycarboxylic acid. Specific examples of compounds that may be employed, in addition to those hereinbefore mentioned, are:

| | |
|---|---|
| Benzyl acrylate | Para-chlorobenzyl acrylate |
| Benzyl methacrylate | Diallyl fumarate |
| Methyl alpha-chloroacrylate | Diethyl itaconate |
| Ethyl alpha-bromoacrylate | Diallyl citraconate |
| Propyl alpha-chloroacrylate | Divinyl biphenyl |
| Para-chlorostyrene | Vinyl methyl ketone |
| Allyl acrylate | Cyclopentadiene |
| Allyl methacrylate | 2-chloro-butadiene-1, 3 (chloroprene) |
| Methallyl acrylate | 2, 3-dimethyl-butadiene-1, 3 |
| Di- and tri-chlorostyrenes | Chlorinated methylstyrenes |
| Chlorinated divinylbenzenes | Chlorinated vinylnaphthalenes |
| Vinyl methyl ether | Hexadiene-1, 5 |
| Vinyl ethyl ether | Octadiene-1, 4 |
| Divinyl ether | 2-cyano-butadiene-1, 3 |
| Methylene methyl malonate | Dimethallyl maleate |
| Methylene ethyl malonate | Dimethallyl itaconate |
| Vinyl chloride | Dimethallyl phthalate |
| Vinylidene chloride | Amyl acrylate |
| Diethylene glycol dimethacrylate (diethylene dimethacrylate) | |
| Glyceryl triacrylate | Hexyl methacrylate |
| Ethylene glycol diacrylate (ethylene diacrylate) | Triallyl citrate |
| Diethylene itaconate | Triallyl aconitate |
| Diethyl maleate | Vinyl acetate |
| Dimethyl fumarate | Vinyl propionate |
| | Vinyl butyrate |

The copolymers of this invention have a wide variety of commercial applications. They may be used alone or in combination with other insulating materials, e. g., paper, fabric materials formed of glass fibers, cotton, silk, rayon, nylon, etc., sheet asbestos, cellulose esters (e. g., cellulose acetate, cellulose acetobutyrate, etc.), Cellophane, etc., as dielectric materials in electrical apparatus. For instance, capacitors and other electrical devices may contain a dielectric material comprising the products of polymerization of a polymerizable mass containing a monovinylphenoxthine as an essential ingredient. Paper-insulated capacitors wherein paper impregnated with a composition comprising a copolymer of a monovinylphenoxthine constitutes the dielectric material is a more specific example of the use of a composition of our invention in electrical applications. Such capacitors may be produced in accordance with conventional manufacturing technique, for instance, as described and illustrated in Clark Patent No. 1,931,373, with particular reference to a different impregnant. Our new copolymers also may be employed as cable impregnants, in impregnating electrical coils, as filling compound in potheads and cable joints, and in numerous other electrical applications. The device to be treated may be impregnated or filled with the polymerizable mixture (e. g., mixture of monomers, mixture of partial polymers, or mixture of monomer and partial polymer), and polymerization effected in situ.

What we claim as new and desire to secure by Letters Patent of the United States is:

1. A composition comprising the product of copolymerization of a mass containing (1) monovinylphenoxthine and (2) a different $CH_2=C<$-containing compound which is copolymerizable with the monovinylphenoxthine.

2. A composition comprising the product of copolymerization of a mass containing (1) monovinylphenoxthine and (2) a diene.

3. A composition comprising the product of copolymerization of a mass containing (1) monovinylphenoxthine and (2) a vinyl-substituted aromatic compound.

4. A composition comprising the product of copolymerization of a mass containing (1) monovinylphenoxthine and (2) butadiene.

5. A composition comprising the product of copolymerization of a mass containing (1) monovinylphenoxthine and (2) styrene.

6. A copolymer of ingredients including 3-vinylphenoxthine and butadiene.

7. A copolymer of ingredients including 3-vinylphenoxthine and styrene.

8. The method of preparing synthetic compositions which comprises heating a mixture of ingredients including (1) monovinylphenoxthine and (2) a different $CH_2=C<$-containing compound which is copolymerizable with the monovinylphenoxthine.

9. The method of preparing synthetic compositions which comprises heating a mixture containing (1) a plurality of different copolymerizable compounds including (a) monovinylphenoxthine and (b) a compound containing a $CH_2=C<$ grouping and (2) a vinyl polymerization catalyst which accelerates the copolymerization of the ingredients of (a) and (b).

10. The method of preparing synthetic compositions which comprises heating an emulsified mixture of ingredients including (1) monovinylphenoxthine and (2) a diene.

11. The method of preparing synthetic compositions which comprises heating an emulsified mixture of ingredients including (1) 3-vinylphenoxthine and (2) butadiene.

12. A composition comprising the product of copolymerization of a mass containing (1) 3-vinylphenoxthine and (2) butadiene-1,3, the 3-vinylphenoxthine comprising from 10 to 90 per cent, by weight, of the total weight of (1) and (2).

13. A composition comprising the product of copolymerization of a mass containing (1) 3-vinylphenoxthine and (2) styrene, the 3-vinylphenoxthine comprising from 10 to 90 per cent, by weight, of the total weight of (1) and (2).

14. A composition comprising the product of copolymerization of a mass containing (1) 3-vinylphenoxthine and (2) acenaphthylene, the 3-vinylphenoxthine comprising from 10 to 90 per cent, by weight, of the total weight of (1) and (2).

RALPH G. FLOWERS.
LEOLA W. FLOWERS.

REFERENCES CITED

The following references are of record in the file of this patent:

UNITED STATES PATENTS

| Number | Name | Date |
|---|---|---|
| 2,125,649 | Reppe | Aug. 2, 1938 |
| 2,324,896 | Zerweck | July 20, 1943 |